United States Patent [19]

Picard

[11] Patent Number: 4,477,088
[45] Date of Patent: Oct. 16, 1984

[54] FACE SEAL MEANS WITH BACK-UP SEAL
[75] Inventor: Harrison R. Picard, Granby, Conn.
[73] Assignee: United Technologies Corporation, Hartford, Conn.
[21] Appl. No.: 451,643
[22] Filed: Dec. 20, 1982
[51] Int. Cl.³ .......................... F16J 15/36; F16J 15/38
[52] U.S. Cl. ........................................ 277/83; 277/88; 277/93 SD; 277/173
[58] Field of Search .................... 277/81 R, 83, 88–90, 277/173–177, 93 R, 93 SD

[56] References Cited
U.S. PATENT DOCUMENTS

| 2,222,654 | 11/1940 | Donaldson | 277/88 X |
| 2,586,739 | 2/1952 | Summers | 277/83 |
| 2,727,765 | 12/1955 | Kilpatrick | 277/83 |
| 3,288,474 | 11/1966 | Gits | 277/83 X |

FOREIGN PATENT DOCUMENTS 653608 5/1951 United Kingdom ................. 277/89

Primary Examiner—Robert S. Ward
Attorney, Agent, or Firm—Norman Friedland

[57] ABSTRACT

In a twin spool gas turbine engine, a bellows serves to bias a carbon seal against its seal plate and a piston ring back-up seal spaced radially outward and axially from the carbon seal provides a controlled leak path in the event the bellows fails.

2 Claims, 1 Drawing Figure

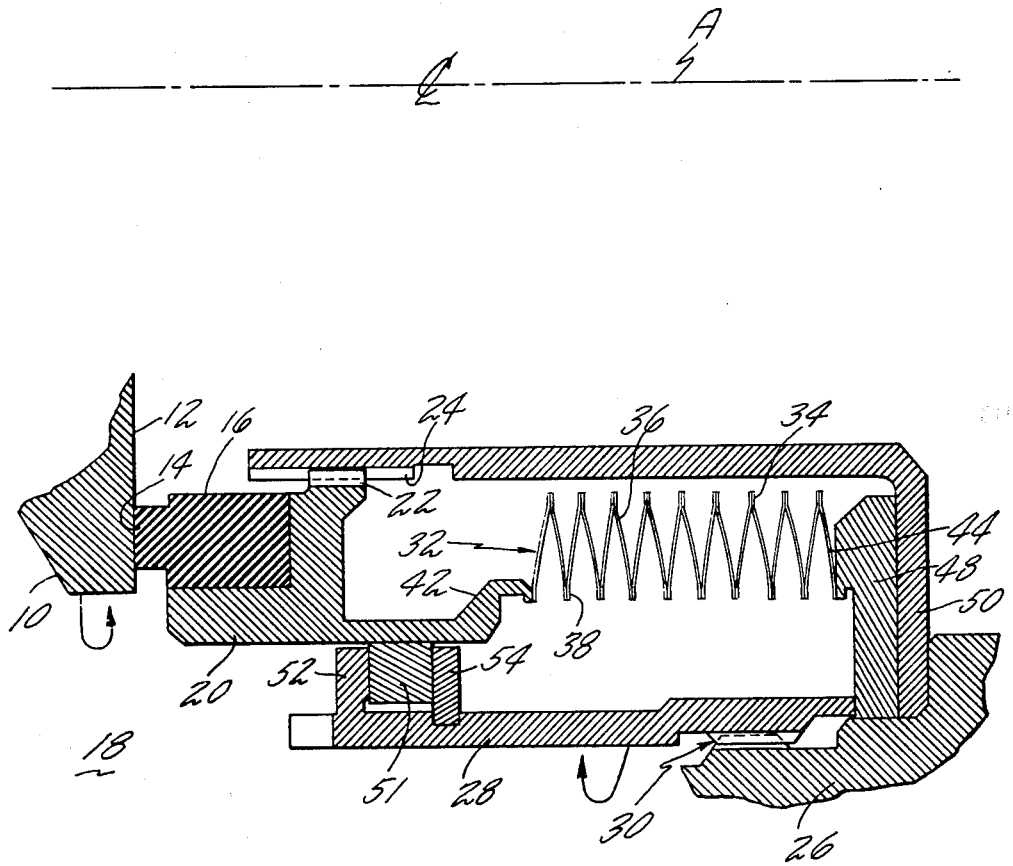

FACE SEAL MEANS WITH BACK-UP SEAL

CROSS REFERENCE

This application relates to another patent application Ser. No. 451,634 filed on even date entitled "Seal Means", filed by J. E. Swanson and assigned to the same assignee as this patent application.

DESCRIPTION

1. Technical Field

This invention relates to gas turbine engines and particularly to the sealing means for the bearing compartment.

2. Background Art

It is customary in a twin spool turbine type power plant to utilize a carbon seal to seal off the compartment housing the bearings supporting one of the shafts. Typically, a seal plate is attached to one rotating shaft and the carbon seal engaging the seal plate is rotatably connected to the other shaft. Means are provided to bias the carbon seal against its cooperating sealplate. In heretofore installations a labyrinth type of seal would be located in proximity to the compartment so that in the event of leakage of the mechanism supporting the primary carbon seal, the labyrinth seal would serve to minimize the same so as to prevent the oil escaping from the bearing compartment into the hostile environment of the engine or vice versa where fire could ensue.

In installations where it is desirable to bias the carbon seal with a cooperating bellows that serves as a sealing element, I have found that I can achieve a satisfactory back-up seal by incorporating a ring type seal and hence eliminate the more complicated and expensive labyrinth type. The back-up ring seal is disposed axially and radially outward of the carbon seal and allows a predetermined leakage should the bellows fail and leak.

It is contemplated that anti-rotational lugs be utilized to prevent spinning of the primary carbon seal.

DISCLOSURE OF THE INVENTION

An object of this invention is to provide for a bearing compartment for a gas turbine engine improved back-up sealing means. A feature of this invention is to include in a rotating carbon seal biased against a rotating seal plate by a bellows, a seal ring disposed axially and radially outward of the carbon seal. The carbon seal is pressure balanced closed in the event of bellows failure and anti-rotational lugs serve to prevent the primary face seal from spinning as a result of being driven by the seal plate.

Other features and advantages will be apparent from the specification and claims and from the accompanying drawings which illustrate an embodiment of the invention.

BRIEF DESCRIPTION OF THE SOLE FIGURE

The sole FIGURE is a partial view partly in schematic and partly in section showing the invention.

BEST MODE FOR CARRYING OUT THE INVENTION

The sole FIGURE shows a portion of the seal plate 10 which is suitably connected to the high speed shaft (rotates about the engine's center line A) of a twin spool gas turbine engine. An example of a gas turbine engine of the type where this invention would be efficacious is the JT9D manufactured by Pratt & Whitney Aircraft, a division of United Technologies Corporation the assignee of this patent application and which is incorporated herein by reference. The sealing face 12 of the seal plate is in intimate contact with the cooperating face 14 of the carbon seal 16. This carbon seal serves as the primary seal of the bearing compartment identified as reference numeral 18 and whose pressure is relatively low. Obviously, the bearing compartment which is suitably enclosed (not shown) contains the oil that is utilized to lubricate and cool the bearings mounted therein (not shown). The purpose of the primary carbon seal is to prevent the escapement of oil out of the compartment or the leakage of high pressure hot gases into the compartment to avoid fire internally of the engine.

Carbon seal 16 is formed in a ring and is supported to the annular member 20 which carries on its inner diameter tabs 22. Tabs 22, in turn mate with elongated spline 24 formed on annular L-shaped (in cross section) member 25 which is rigidly connected to low speed shaft 26. As is well known, the high speed shaft carries the high pressure compressor and high temperature turbine and the low speed shaft carries the low pressure compressor and low temperature turbine hence the name, twin spool. The annular member 24 is driven by the ring member 28 which is concentric to member 24. The spline arrangement 30 serves to drive ring 28 and hence the annular member 25, carbon seal 16 and the bellows assembly generally indicated by reference numeral 32.

The bellows assembly comprises bellows 34 fabricated by individual convoluted elements 36 welded at the outer extremities 38 and 40. One end of bellows 34 is supported to the extending arm 42 unitary with the carbon seal support 20 and the opposite end 44 of bellows 34 is affixed to the disc 48 mounted adjacent to the radial arm 50 of annular member 25. This urges the carbon seal support 20 leftwardly as viewed in the drawing to urge the face 14 of carbon seal 16 to bear against the face 12 of seal plate 10 forming a substantially leak-tight seal. The tabs 22 while restraining circumferential movement can move axially. This permits the higher speed seal plate from driving the support member 20.

According to this invention, a back-up seal is disposed axially and radially outward from the carbon seal 16 and comprises a ring seal 51 of the piston ring type sandwiched between the upstanding arm 52 formed on member 28 and the anti-torque member 54 supported to member 28. Ring seal 51 is sized so that its inner diameter bears against the outer diameter of carbon seal support 20 and permits a predetermined leakage so that there is a slight flow path from the high pressure side past tabs 22 into bellows 34 (assume a leak occurred) and past the seal 51 at the point of contact with the inner diameter of member 20.

By virtue of this arrangement, the primary carbon seal 16 is pressure balanced to the close or seal position in the event of bellows failure.

This invention provides a substantially low heat generation and controlled air leakage of a bellows seal while providing a simple backup to the bellows.

It should be understood that the invention is not limited to the particular embodiments shown and described herein, but that various changes and modifications may be made without departing from the spirit and scope of this novel concept as defined by the following claims.

I claim:

1. Sealing means for a bearing compartment of a twin spool gas turbine engine having a seal plate rotating at a first speed, an annularly shaped carbon seal having a face bearing against said seal plate in sealing relationship and rotating at a second speed relative to said first speed, an annular support means carrying said carbon seal including first and second annular members having an anti-rotational tab allowing axial movement, a concentric sleeve radially spaced from said second annular member defining therewith an annular cavity, a bellows disposed in said cavity having one end bearing against said first annular member to load said carbon seal against said seal plate, a back-up seal disposed between said carbon seal and said bellows and being located axially and radially outward from said carbon seal and attachment means for connecting said carbon seal, bellows and back-up seal to one of said spools for imparting rotary motion thereto.

2. Sealing means as in claim 1 wherein said back-up seal is a piston-like ring bearing up against a sealing surface formed on said first annular member having sufficient tolerance to allow a predetermined leakage to flow therethrough when said bellows fails and permits the flow of air.

* * * * *